(12) United States Patent
Honeyman et al.

(10) Patent No.: US 7,206,119 B2
(45) Date of Patent: Apr. 17, 2007

(54) ELECTRO-OPTIC DISPLAYS, AND METHOD FOR DRIVING SAME

(75) Inventors: Charles Howie Honeyman, Roslindale, MA (US); Richard J. Paolini, Jr., Arlington, MA (US); Michael L. Steiner, New Richmond, WI (US); Thomas H. Whitesides, Somerville, MA (US); Andrew Y. Oleson, Boston, MA (US); Richard M. Webber, Brookline, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 11/021,629

(22) Filed: Dec. 23, 2004

(65) Prior Publication Data

US 2005/0152022 A1   Jul. 14, 2005

Related U.S. Application Data

(60) Provisional application No. 60/561,754, filed on Apr. 13, 2004, provisional application No. 60/481,847, filed on Dec. 31, 2003.

(51) Int. Cl.
*G02B 26/00* (2006.01)

(52) U.S. Cl. .................. 359/296; 345/107; 348/762; 348/767

(58) Field of Classification Search ............ 359/296; 348/762, 767; 345/84, 107
See application file for complete search history.

(56) References Cited

U.S. PATENT DOCUMENTS

| | | | |
|---|---|---|---|
| 3,668,106 A | 6/1972 | Ota | |
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 4,418,346 A | 11/1983 | Batchelder | |
| 5,745,094 A | 4/1998 | Gordon, II et al. | |
| 5,760,761 A | 6/1998 | Sheridon | |

(Continued)

FOREIGN PATENT DOCUMENTS

EP    1 099 207 B1    3/2002

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Evelyn A. Lester
(74) *Attorney, Agent, or Firm*—David J. Cole (57) ABSTRACT

Electro-optic displays contain a plurality of types of electro-optic media within a single layer. One form of display has separate areas which undergo different color changes so that the display can blink the same image in different colors. A second form of display has areas which switch at different rates so that images can appear transiently. A third form of display has a medium comprising multiple types of electro-optic elements having differing color states and switching speeds to allow display of a wide color gamut.

6 Claims, 5 Drawing Sheets

U.S. PATENT DOCUMENTS

| | | | |
|---|---|---|---|
| 5,777,782 A | 7/1998 | Sheridon | |
| 5,808,783 A | 9/1998 | Crowley | |
| 5,872,552 A | 2/1999 | Gordon, II et al. | |
| 5,930,026 A | 7/1999 | Jacobson et al. | |
| 5,961,804 A | 10/1999 | Jacobson et al. | |
| 6,017,584 A | 1/2000 | Albert et al. | |
| 6,054,071 A | 4/2000 | Mikkelsen, Jr. | |
| 6,055,091 A | 4/2000 | Sheridon et al. | |
| 6,067,185 A | 5/2000 | Albert et al. | |
| 6,097,531 A | 8/2000 | Sheridon | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 * | 3/2003 | Jacobson et al. | 359/296 |
| 6,545,291 B1 | 4/2003 | Amundson et al. | |
| 6,580,545 B2 | 6/2003 | Morrison et al. | |
| 6,583,780 B1 | 6/2003 | Kawai | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Honeyman et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et al. | |
| 6,865,010 B2 | 3/2005 | Duthaler et al. | |
| 6,866,760 B2 | 3/2005 | Paolini Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 2002/0060321 A1 | 5/2002 | Kazlas et al. | |
| 2002/0063661 A1 | 5/2002 | Comiskey et al. | |
| 2002/0090980 A1 | 7/2002 | Wilcox et al. | |
| 2002/0113770 A1 | 8/2002 | Jacobson et al. | |
| 2002/0130832 A1 | 9/2002 | Baucom et al. | |
| 2002/0180687 A1 | 12/2002 | Webber | |
| 2003/0011560 A1 | 1/2003 | Albert et al. | |
| 2003/0102858 A1 | 6/2003 | Jacobson et al. | |
| 2003/0132908 A1 | 7/2003 | Herb et al. | |
| 2003/0151702 A1 | 8/2003 | Morrison et al. | |
| 2003/0222315 A1 | 12/2003 | Amundson et al. | |
| 2004/0014265 A1 | 1/2004 | Kazlas et al. | |
| 2004/0075634 A1 | 4/2004 | Gates | |
| 2004/0094422 A1 | 5/2004 | Pullen et al. | |
| 2004/0105036 A1 | 6/2004 | Danner et al. | |
| 2004/0112750 A1 | 6/2004 | Jacobson et al. | |
| 2004/0119681 A1 | 6/2004 | Albert et al. | |
| 2004/0136048 A1 | 7/2004 | Arango et al. | |
| 2004/0155857 A1 | 8/2004 | Duthaler et al. | |
| 2004/0180476 A1 | 9/2004 | Kazlas et al. | |
| 2004/0190114 A1 | 9/2004 | Jacobson et al. | |
| 2004/0196215 A1 | 10/2004 | Duthaler et al. | |
| 2004/0226820 A1 | 11/2004 | Webber et al. | |
| 2004/0239614 A1 | 12/2004 | Amundson et al. | |
| 2004/0252360 A1 | 12/2004 | Webber et al. | |
| 2004/0257635 A1 | 12/2004 | Paolini, Jr. et al. | |
| 2004/0263947 A1 | 12/2004 | Drzaic et al. | |
| 2005/0001810 A1 | 1/2005 | Yakushiji et al. | |
| 2005/0001812 A1 | 1/2005 | Amundson et al. | |
| 2005/0007336 A1 | 1/2005 | Albert et al. | |
| 2005/0007653 A1 | 1/2005 | Honeyman et al. | |
| 2005/0012980 A1 | 1/2005 | Wilcox et al. | |
| 2005/0017944 A1 | 1/2005 | Albert | |
| 2005/0018273 A1 | 1/2005 | Honeyman et al. | |
| 2005/0024353 A1 | 2/2005 | Amundson et al. | |
| 2005/0035941 A1 | 2/2005 | Albert et al. | |

| 2005/0041004 A1 | 2/2005 | Gates et al. |
| 2005/0062714 A1 | 3/2005 | Zehner et al. |
| 2005/0067656 A1 | 3/2005 | Denis et al. |
| 2005/0078099 A1 | 4/2005 | Amundson et al. |
| 2005/0105159 A1 | 5/2005 | Paolini, Jr. et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0122565 A1 | 6/2005 | Doshi et al. |
| 2005/0151709 A1 | 7/2005 | Jacobson et al. |
| 2005/0168799 A1 | 8/2005 | Whitesides et al. |
| 2005/0179642 A1 | 8/2005 | Wilcox et al. |
| 2005/0270261 A1 | 12/2005 | Danner et al. |

FOREIGN PATENT DOCUMENTS

| EP | 1 145 072 B1 | 5/2003 |
| EP | 1 462 847 | 9/2004 |
| EP | 1 482 354 | 12/2004 |
| EP | 1 484 635 | 12/2004 |
| EP | 1 500 971 A1 | 1/2005 |
| EP | 1 501 194 A1 | 1/2005 |
| EP | 1 536 271 | 6/2005 |
| EP | 1 542 067 | 6/2005 |
| EP | 1 577 702 | 9/2005 |
| EP | 1 577 703 | 9/2005 |
| EP | 1 598 694 | 11/2005 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 2004/001498 | 12/2003 |
| WO | WO 2004/079442 | 9/2004 |
| WO | WO 2004/090626 | 10/2004 |

OTHER PUBLICATIONS

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997).

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Appliances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

ELECTRO-OPTIC DISPLAYS, AND METHOD FOR DRIVING SAME

REFERENCE TO RELATED APPLICATIONS

This application claims benefit of application Ser. No. 60/481,847, filed Dec. 31, 2003, and of application Ser. No. 60/561,754, filed Apr. 13, 2004.

The entire contents of the aforementioned applications are herein incorporated by reference. The entire contents of all United States Patents and published and copending Applications mentioned below are also herein incorporated by reference.

BACKGROUND OF THE INVENTION

This invention relates to electro-optic displays and to methods for driving such displays. More specifically, in one aspect this invention relates to electro-optic displays with simplified backplanes, and methods for driving such displays. In another aspect, this invention relates to electro-optic displays in which multiple types of electro-optic units are used to improve the colors available from the displays. The present invention is especially, though not exclusively, intended for use in electrophoretic displays.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

In the displays of the present invention, the electro-optic medium will typically be a solid (such displays may hereinafter for convenience be referred to as "solid electro-optic displays"), in the sense that the electro-optic medium has solid external surfaces, although the medium may, and often does, have internal liquid- or gas-filled spaces. Thus, the term "solid electro-optic displays" includes encapsulated electrophoretic displays, encapsulated liquid crystal displays, and other types of displays discussed below.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. patent application Ser. No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", Asia Display/IDW '01 (Proceedings of the 21st International Display Research Conference in conjunction with The 8th International Display Workshops, Oct. 16–19, 2001, Nagoya, Japan), page 1517, Paper HCS1-1, and Yamaguchi, Y, et al., "Toner display using insulative particles charged triboelectrically", Asia Display/IDW '01, page 1729, Paper AMD4-4. See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,727,881; 6,738,050; 6,750,473; 6,753,999; 6,816,147; 6,819,471; 6,822,782; 6,825,068; 6,825,829; 6,825,970; and 6,831,769; and U.S. Patent Applications Publication Nos. 2002/0060321; 2002/0063661; 2002/0090980; 2002/0113770; 2002/0130832; 2002/0131147; 2002/0171910; 2002/0180687; 2002/0180688; 2003/0011560; 2003/0020844; 2003/0025855; 2003/0102858; 2003/0132903; 2003/0137521; 2003/0137717; 2003/0151702; 2003/0214695; 2003/0214697; 2003/0222315; 2004/0008398; 2004/0012839; 2004/0014265; 2004/0027327; 2004/0075634; 2004/0094422; 2004/0105036; 2004/0112750; 2004/0119681; and 2004/0196215; and International Applications Publication Nos. WO 99/67678; WO 00/05704; WO 00/38000; WO 00/38001; WO 00/36560; WO 00/67110; WO 00/67327; WO 01/07961; WO 01/08241; WO 03/107,315; WO 2004/023195; WO 2004/049045; WO 2004/059378; WO 2004/088002; WO 2004/088395; and WO 2004/090857.

Known electrophoretic media, both encapsulated and unencapsulated, can be divided into two main types, referred to hereinafter for convenience as "single particle" and "dual particle" respectively. A single particle medium has only a single type of electrophoretic particle suspended in a suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode (so that the particles are hidden by the suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01 281, and published US Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R.A., et al. "Video-Speed Electronic Paper Based on Electrowetting", Nature, Volume 425, (Sep.25, 2003), pages 383–385. It is shown in copending application Ser. No. 10/711,802, filed Oct. 6, 2004 (Publication No. 2005/0151709), that such electro-wetting displays can be made bistable.

Other types of electro-optic materials may also be used in the present invention. Of particular interest, bistable ferroelectric liquid crystal displays (FLC's) are known in the art.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the-clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

However, the cost reductions provided by the use of encapsulated electrophoretic media have hitherto not been accompanied by corresponding cost reductions in the components used for driving the display. High resolution prior art electrophoretic and other electro-optic displays have typically used active matrix backplanes similar to the those used in liquid crystal displays and comprising a matrix of non-linear elements, typically thin film transistors, each associated with one pixel electrode, the pixel electrodes each defining one pixel of the display. A single common electrode which extends across the entire display (or at least across a large number of pixel electrodes) is disposed on the opposed side of the electro-optic medium from the pixel electrodes. The voltages applied to the pixel electrodes are controlled in a well-known manner so that each of the pixels of the display can be brought to any desired optical state. Although such active matrix backplanes can write any desired image on the electro-optic medium, they are expensive, the cost of the backplane amounting to about 80 per cent of the total cost of the display. Furthermore, since such backplanes are typically produced using semiconductor fabrication techniques developed for use in the computer industry, the maximum size of the individual backplanes is limited, and large displays, for example those used to display data in airports, or railroad stations, or as billboards, may require the use of the multiple backplanes "tiled" to cover the desired area; such tiling produces additional complications, such as providing robust leads to ensure that the necessary data are supplied to each individual display.

Other electro-optic displays, especially text-based displays which do not require the ability to display any arbitrary image, have used so-called "direct drive" backplanes; see, for example, the aforementioned WO 00/05704 (see also the corresponding European Patent No. 1,099,207). In such direct drive backplanes, a plurality of electrodes are provided; for example, the aforementioned WO 00/05704 describes a direct drive backplane in which any alphanumeric character (of the Roman alphabet) can be displayed by applying voltage to selected ones of 63 electrodes. It will readily be apparent that displays intended to display large numbers of characters will require very large numbers of electrodes, and that the cost of fabricating such large numbers of electrodes, together with the voltage supply lines and control circuits necessary to drive the electrodes, results in substantial costs for the direct drive backplane.

There are certain potential applications of electrophoretic and other electro-optic displays, for example in point-of-purchase (POP) displays in retail stores, and in large billboard type displays, where the low power consumption and low cost of the electro-optic medium render the use of "blinking" electro-optic displays (i.e., displays which can flash a fixed image) attractive, and the present invention relates to methods for driving such blinking electro-optic displays, and to such electro-optic displays themselves.

Also, as already mentioned, another aspect of the present invention relates to color displays. One of the problems with many electro-optic displays is the limited range of colors which each pixel of the display can produce. As discussed above, both the single and dual particle types of electrophoretic display normally only display two colors at each pixel, the colors of the particle and the suspending fluid in a single particle display, and the colors to the two types of particles in an dual particle display. To be more accurate, such displays produce, in principle, a gradation of colors between their extreme optical states. For example, a display having black and white extreme optical states may be capable of displaying multiple shades of gray, but is not capable of displaying any colors other than black, white and gray. In the same manner, a dual particles display using green and red pigments may be capable of displaying a "pseudo-gray scale" in green and red, from a green extreme optical state to a red extreme optical state, with a range of green and brown "gray states" in between.

Thus, in general, the colors available from an electro-optic display are those falling along a single line when plotted in a conventional color space, for example the standard ICE L*a*b color space, and the same range of colors will be seen when switching in either direction, i.e., from red to green or from green to red. This type of red/green medium might be useful (in conjunction with black/white electro-optic units) for making a display with spot color or for certain applications where a black/white color transition is not required. However, for the reasons already discussed, the available color gamut from such a display is inherently limited.

One approach to expanding the limited range of colors available from conventional electro-optic displays is to place an array of colored filters over the pixels of the display. For example, consider the effect on a display comprising white particles in a black fluid of placing an array of color filters (say red, green and blue) over the individual pixels of the display. Moving the white particles adjacent the viewing surface of a pixel covered with a red filter would color that pixel red, whereas moving the white particles of the same pixel adjacent the rear surface of the display would render the pixel black. The main problem with this approach to generating color is that the brightness of the display is limited by the pixelation of the color filter. For example, if a red color is desired, the pixels covered by red filters are set to appear red, whereas the pixels covered by green and blue filters are set to appear dark, so that only a fraction of the display surface has the desired color while the remaining portion is dark, thus limiting the brightness of any color obtained.

A related approach does not use color filters but instead uses patterned areas of differing types of electro-optic media having differing optical characteristics. For example, as described in the aforementioned 2002/01 80688 and WO 2004/088002, differing types of electrophoretic capsules capable of differing extreme optical states may be deposited in alignment with multiple sets of electrodes to produce color displays. However, this approach suffers from limited brightness similar to that of the color filter approach, in that, for example, if a red area is desired only a fraction of the desired area can be set to appear red.

Both the color filter and patterned media approaches require registration of the differing areas of the filter or media with multiple sets of electrodes, and may involve complex techniques for producing the display, thus increasing the cost of the display and possibly compromising its optical quality, especially in the case of high resolution displays in which the individual pixels are very small.

A reflective display that was capable of three or more optical states (black, white and color or black, white and transparent) would significant advantages in image quality, cost and ease of manufacture, and the present invention seeks to provide such a display.

SUMMARY OF THE INVENTION

In one aspect, this invention provides an electro-optic display comprising:
a layer of an electro-optic medium; and
at least one electrode disposed adjacent the layer of electro-optic medium and arranged to apply an electric field in either direction to the layer of electro-optic medium,
the layer of electro-optic medium comprising at least one first area of a first electro-optic medium, the first electro-optic medium displaying a first optical characteristic when an electric field is applied in one direction across the layer of electro-optic medium and a second optical characteristic when the electric field is applied in the opposed direction across the layer of electro-optic medium, the layer of electro-optic medium also comprising at least one second area of a second electro-optic medium, the second electro-optic medium displaying a third optical characteristic different from the first optical characteristic when an electric field is applied in said one direction across the layer of electro-optic medium and a fourth optical characteristic different from the second optical characteristic when the electric field is applied in said opposed direction across the layer of electro-optic medium.

This aspect of the invention may hereinafter be referred to as the "double medium" aspect of the invention.

Such a double medium display may make use of any of the types of electro-optic medium described above. For example, the first and second electro-optic media may both be of the rotating bichromal member type, but with rotating members having differing colors. The first and second electro-optic media may also be particle-based electrophoretic media using particles (and optionally colored suspending fluids) having differing colors. The electrophoretic media may be microcavity particle-based electrophoretic media comprising a plurality of discrete droplets of two different electrophoretic internal phases (i.e., one or more types of electrophoretic particles in a suspending fluid).

In a preferred form of such a display, the first and fourth optical characteristics are substantially the same, and the second and third optical characteristics are substantially the same.

This invention also provides a process for driving an electro-optic display, the process comprising:
providing a layer of an electro-optic medium having at least one first area of a first electro-optic medium, the first electro-optic medium displaying a first optical characteristic when an electric field is applied in one direction across the layer of electro-optic medium and a second optical characteristic when the electric field is applied in the opposed direction across the layer of electro-optic medium, the layer of electro-optic medium also having at least one second area of a second electro-optic medium, the second electro-optic medium displaying a third optical characteristic different from the first optical characteristic when an electric field is applied in said one direction across the layer of electro-optic medium and a fourth optical characteristic different from the second optical characteristic when the electric field is applied in said opposed direction across the layer of electro-optic medium;

applying an electric field in said one direction across the layer of electro-optic medium, thereby causing the at least one first area to display said first optical characteristic and the at least one second area to display said third optical characteristic; and applying an electric field in said opposed direction across the layer of electro-optic medium, thereby causing the at least one first area to display said second optical characteristic and said at least one second area to display said fourth optical characteristic.

In this process, the first and second electro-optic media may both be of the rotating bichromal member type, but with rotating members having differing colors. The first and second electro-optic media may also be particle-based electrophoretic media using particles (and optionally colored suspending fluids) having differing colors. The electrophoretic media may be microcavity particle-based electrophoretic media comprising a plurality of discrete droplets of two different electrophoretic internal phases.

In another aspect, this invention provides an electro-optic display comprising a layer of electro-optic medium having first and second optical states differing in at least one optical characteristic, the medium being capable of being changed from its first optical state to its second optical state by application of an electric field thereto, and at least one electrode disposed adjacent the layer of electro-optic medium and arranged to apply an electric field thereto, the layer of electro-optic medium having at least one first area having a first thickness and at least one second area having a second thickness less than the first thickness, such that, upon application of an electric field to the electro-optic medium by the electrode, the at least one second area will change from its first to its second optical state at a rate different from the at least one first area.

This display may hereinafter be referred to as the "differential thickness" display of the invention. Such a differential thickness display may make use of any of the types of electro-optic medium described above. For example, the electro-optic medium may both be of the rotating bichromal member type, but with rotating members having differing colors. The electro-optic medium may alternatively be a particle-based electrophoretic medium, especially a microcavity particle-based electrophoretic medium.

There are two main preferred variants of the differential thickness display of the invention. In the first variant, illustrated in FIG. 2 of the accompanying drawings, a shim material having a controlled resistivity differing from that of the electro-optic medium is inserted adjacent the electro-optic medium layer itself, typically between the first area(s) of this layer and one electrode, so as to reduce directly the thickness of the electro-optic medium layer. In the second variant, illustrated in FIG. 3, a shim layer of material (the resistivity of this material is irrelevant) is inserted at a position spaced from the electro-optic medium layer, typically on the opposed side of one electrode from this layer, although the material may be separated from the electro-optic medium layer by a substrate not containing an electrode, for example in the case of a stylus-based display. In this second variant, the shim layer distorts the layer(s) lying between it and the electro-optic medium layer, thus indirectly reducing the thickness of the electro-optic medium layer. When it is necessary to distinguish these two main variants, they will be referred to as the "internal shim" and "external shim" variants respectively.

The invention also provides a convenient and economical process for producing an internal shim differential thickness display. In this process, a layer of conductive material (typically a thin metal film supported on a substrate) is imagewise printed with an ink, and the ink-bearing conductive layer is thereafter fixed adjacent (typically laminated to) an electro-optic layer to form the final display. Conveniently, the ink-bearing conductive layer is laminated to a front plane laminate as described in the aforementioned 2004/0027327. Many commercial inks, typically those containing substantial amounts of polymer, give dried ink layers suitable for use as internal shims in the present displays, and since printing technologies capable of printing on metal foils are well developed, being used commercially on a large scale to prepare decorative wrapping materials, such printing processes provide an economical way to prepare backplanes for use in the displays of the present invention.

A differential thickness display may be driven so that both the first and second areas change from the their first to their second optical states, so that the message or design formed by the first and second areas appears transiently due to the different thicknesses and response rates of the first and second areas. Alternatively, the electric field may be applied for a period such that one of the first and second areas change optical state but the other does not, so that the message or design is displayed for an extended period limited only by the bistability of the medium. Obviously, other drive schemes may also be used.

This invention also provides an electro-optic display comprising an electro-optic medium comprising a plurality of first electro-optic elements and a plurality of second electro-optic elements, the first and second electro-optic elements being intermixed with one another, and at least one electrode for applying an electric field to the electro-optic medium, the first electro-optic elements having first and second optical states differing in at least one optical characteristic, the first electro-optic elements being capable of being changed from their first to their second optical state by application of an electric field thereto, and the second electro-optic elements having third and fourth optical states differing in at least one optical characteristic, the second electro-optic elements being capable of being changed from their third to their fourth optical state by application of an electric field thereto, the fourth optical characteristic differing from both the first and second optical characteristics, the first and second electro-optic elements differing in that, for any given electric field applied to the electro-optic medium, the first electro-optic elements switch between their first and second states at a rate different from that at which the second electro-optic elements switch between their third and fourth optical states.

This display may hereinafter be referred to as the "mixed color" display of the invention. Such a mixed color display may make use of any of the types of electro-optic medium described above. For example, the electro-optic medium may both be of the rotating bichromal member type, but with rotating members having differing colors. Alternatively, the first and second electro-optic elements may comprise particle-based electrophoretic media. If such electrophoretic media are of a microcavity type, the electrophoretic media comprising the first and second electro-optic elements will typically be retained within separate microcavities. The fourth (and optionally the third) optical characteristic of the display may differ from both the first and second optical characteristics. The display may further comprise a plurality of third electro-optic elements intermixed with the first and second electro-optic elements, the third electro-optic elements being capable of being switched between a dark optical state and a light optical state by an electric field applied to the electro-optic medium, the dark and light optical states differing from the first, second, third and fourth optical states, and the third electro-optic elements differing from the first and second electro-optic elements in that, for any given electric field applied to the electro-optic medium, the third electro-optic elements switch between their dark and light states at a rate different from that at which the first and second electro-optic elements switch between their first and second, and third and fourth respectively, optical states.

DETAILED DESCRIPTION

As already mentioned, the present invention has three main aspects, namely (a) double medium displays, and processes for driving such displays; (b) differential thickness displays; and (c) mixed color displays. These various aspects of the present invention will be described separately below, although it should be understood that a single display may make use of more than one aspect of the present invention.

Double Medium Displays, and Processes for Driving Such Displays

As already mentioned, in one aspect this invention provides a double medium display in which a single electro-optic layer contains two different types of electro-optic medium having different characteristics. This double medium display displays a fixed image but the appearance of the image changes depending upon the direction of the applied electric field. In a preferred from of this type of display, the image reverses color when the electric field is reversed; for example, the image may be white-on-black when the field is applied in one direction and black-on-white when the field is applied in the reverse direction. Thus, for example, the double medium display could be used to provide an eye-catching display of a corporate logo or trade mark in a POP display, or in a large, billboard-type display in an arena or stadium. This can be effected by making the first and fourth optical characteristics of the display substantially the same and the second and third optical characteristics of the display substantially the same. Alternatively, the first, second, third and fourth optical characteristics may all be different, so that as the direction of the electric field across the electro-optic layer is reversed, both the foreground and background colors of the image change; for example, when the electric field is in one direction, the image could be black on yellow, while when the electric field is reversed the image could be white on blue. Such dramatic color changes are very effective in providing an eye-catching display.

Although as already mentioned other types of electro-optic media may be used, a double medium display can be conveniently constructed using two different types of microcavity electrophoretic media. It is shown in the aforementioned U.S. Pat. No. 6,822,782 that the charge on electrophoretic particles can be altered by providing such particles with a polymeric coating, which may itself contain charged or chargeable groups. Modifying the charge on electrophoretic particles in this manner enables one to produce electrophoretic particles with the same optical characteristics but of opposite charges. For example, titania particles can be produced with both positive and negative charges. By encapsulating such oppositely-charged particles separately with a colored suspending fluid, in the manner described in many of the aforementioned E Ink and MIT patents and applications, one can provide the double medium display (generally designated 100) shown in FIGS. 1A and 1B of the accompanying drawings.

Figure 1A:
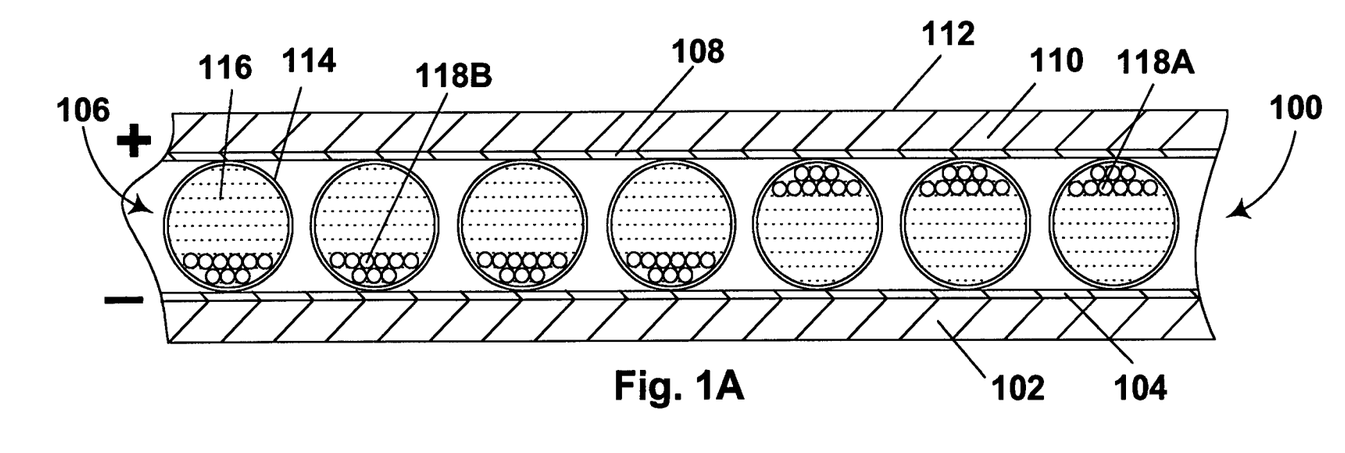
FIG. 1A of the accompanying drawings is a schematic side elevation of a double medium display of the invention, shown with an electric field applied in one direction.
Figure 1B:
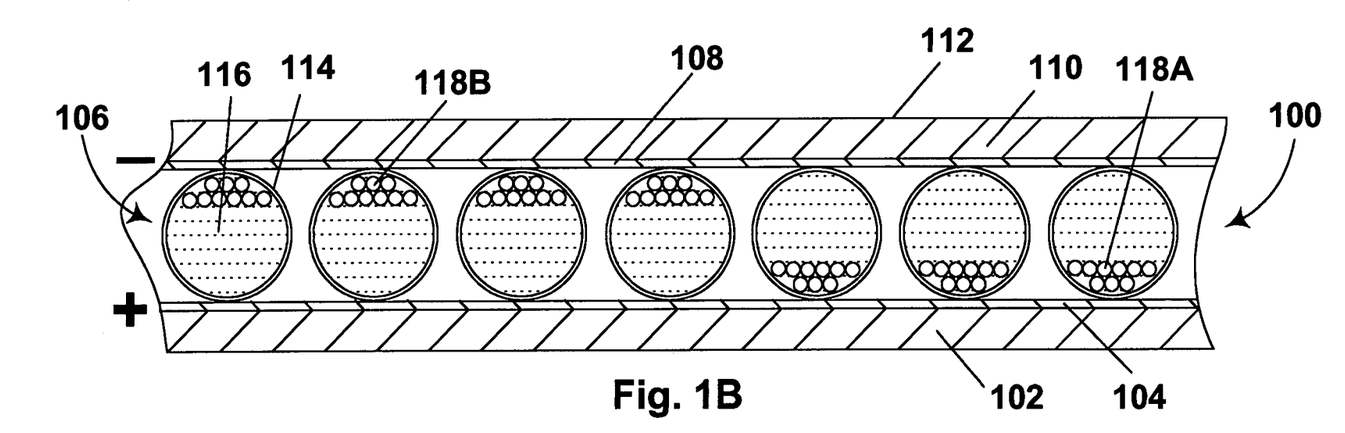
FIG. 1B is a schematic side elevation similar to that of FIG. 1A but showing the display with the electric field applied in the opposed direction.

The display 100 comprises a substrate 102 bearing a single continuous rear electrode 104; this electrode 104 may or may not be light-transmissive. The display 100 further comprises a layer of electrophoretic medium (generally designated 106), a single continuous light-transmissive front electrode 108 and a front substrate 110, which serves as a protective layer for the display 100, helping to prevent mechanical damage to the electrophoretic layer 106. The exposed surface 112 of the front substrate 110 serves as the viewing surface through which an observer views the display 100.

The electrophoretic layer 106 comprises a plurality of capsules, each of which comprises a capsule wall 114 within which is encapsulated a colored suspending fluid 116, which is typically dyed blue. However, the capsules are of two different types. One type of capsules, illustrated by the three capsules at the right-hand side of FIG. 1A, contain negatively charged white titania particles 118A; the second type of capsules, illustrated by the four capsules at the left-hand side of FIG. 1B, contain positively charged titania particles 118B.

As indicated by the + and − signs adjacent the electrodes 108 and 104 respectively, FIG. 1A shows the display when the front electrode 108 is made positive relative to the rear electrode 104. In this situation, the negatively charged particles 118A are attracted to the front electrode 108, so that the first areas of the display (i.e., the areas in which the capsules contain the negatively charged particles 118A) display the color of the white particles 118A. On the other hand, the positively charged particles 118B are attracted to the rear electrode 104, so that the second areas of the display (i.e., the areas in which the capsules contain the positively charged particles 118B) display the blue color of the suspending fluid 116.

In contrast, FIG. 1B shows the display 100 when the front electrode 108 is made negative relative to the rear electrode 104. In this situation, the negatively charged particles 118A are attracted to the rear electrode 104, so that the first areas of the display 100 display the blue color of the suspending fluid 116. On the other hand, the positively charged particles 118B are attracted to the front electrode 108, so that the second areas of the display 100 display the color of the white particles 118B. Thus, by changing the relative polarity of the front and rear electrodes 108 and 104 respectively, the display 100 can change from a white-on-blue to a blue-on-white image.

It will be appreciated that the double medium display of the present invention is not confined to the use of a single type of particle in a colored suspending fluid. For example, the double medium display may use dual particle media of both the same polarity and opposite polarity types; see, for example, the aforementioned 2002/0171910. For example, in the display 100 shown in FIGS. 1A and 1B, the suspending fluid 116 could be uncolored, while the capsules containing the negatively charged particles 118A could also contain positively charged black particles, while the capsules containing the positively charged particles 118B could also contain negatively charged black particles, so that the display could change from a white-on-black to a black-on-white image. Also, depending upon the colors chosen for the particles and the suspending fluid, the colors displayed in the state corresponding to FIG. 1A could be completely different from those in the state corresponding to FIG. 1B; for example, the display might change from a blue-on-yellow image to a red-on-green image.

Differential Thickness Displays

As already indicated, in another aspect the present invention provides a differential thickness electro-optic display in which the layer of electro-optic medium has at least one first area having a first thickness and at least one second area having a second thickness less than the first thickness, such that, upon application of an electric field to the electro-optic medium by the electrode, the at least one second area will change from its first to its second optical state at a rate different from the at least one first area. As explained above, there are two principal variants of such a differential thickness display, the internal shim and external shim variants, depending upon whether the layer used to control the thickness of the electro-optic medium is or is not adjacent this electro-optic medium layer.

In one process for the production of an internal shim differential thickness display, a thin cut-out or shim having the form of the desired image is formed and placed on an electrode (typically mounted upon a substrate). The electro-optic medium is then coated (or, depending upon the type of electro-optic medium used, laminated) over the electrode and shim, so that the layer of electro-optic medium formed is thinner in the areas covered by the shim than in the remaining areas. The electro-optic medium is then secured to a second electrode; typically, the medium is laminated to the second electrode using a lamination adhesive.

In an internal shim differential thickness display, a wide variety of materials, including printed inks, may be used to form the shim, but in order that the completed display may function in the desired manner, it is necessary to consider carefully the resistivity of the shim material. In one variant of such a display, the shim material has a volume resistivity lower than that of the electro-optic medium itself in order to ensure that the applied electric field across the electro-optic medium is higher in the areas covered by the shim than in the remaining areas. The shim may be formed of a conductive material, for example a metal or a conductive polymer. However, the volume resistivity of many electro-optic media is so high (for example, of the order of $10^{10}$ ohm cm for many electrophoretic media) that many polymers and other materials normally considered as insulators have sufficient conductivity to be used in the shims. In a second variant, a high volume resistivity material is used for the shim so that the applied electric field across the electro-optic medium is lower in the areas covered by the shim than in the remaining areas, so that the change of optical state occurs more slowly in the areas covered by the shim. However, this approach is some times undesirable, since it produces a display which changes state more slowly than a display using a more conductive internal shim, whereas it is generally preferred to use a display which can flash rapidly when desired, since rapid flashing tends to be more eye-catching.

A very similar process may be used to form an external shim differential thickness display by placing the required shim on a substrate, covering the shim with an electrode (and, typically, a supporting layer) and then coating or otherwise placing the electrophoretic medium layer over the electrode.

It will be appreciated that, in an external shim differential thickness display, the shim functions only to affect the thickness of one or more areas of the electro-optic layer. Depending upon the materials used for the various layers of the display, the change in thickness caused by the external shim may be permanent, and if so the external shim may be removed after it has served its function of causing the desired thickness variation. Indeed, in some cases, the "external shim" could have the form of a permanent die which is applied to a succession of displays during their production. Such an arrangement has the advantage that a variety of dies can be stored and the die in use changed quickly (in conventional pressing apparatus that will be familiar to those skilled in the art), thus enabling any of a variety of patterned displays to be produced on an "as needed" basis.

When an electric field is applied to a differential thickness display of the present invention, the thinner area (the message) will typically be addressed more quickly than the rest of the surrounding area due to the thinner layer of electro-optic medium (although as already noted an internal shim differential thickness display can be arranged to have a thinner area which is addressed more slowly than the rest of the surrounding area). By controlling the thickness of the shim and the duration of the addressing pulse, one can create a display where the message switches to a large contrast from the background and then stop the pulse leaving the addressed message visible in a stable state. Alternatively, the message could be displayed only transiently by allowing a longer duration to the electrical pulse which would allow the background to address as well. In this case, an observer would see the message address very quickly and then disappear into a uniform background.

Thus, it will be seen that a differential thickness display of the present invention requires no patterning of electrodes at all, and also requires no special printing techniques. The only things that need to be controlled are the thickness of the shim, and the length and voltage of the addressing pulses.

Figure 2:
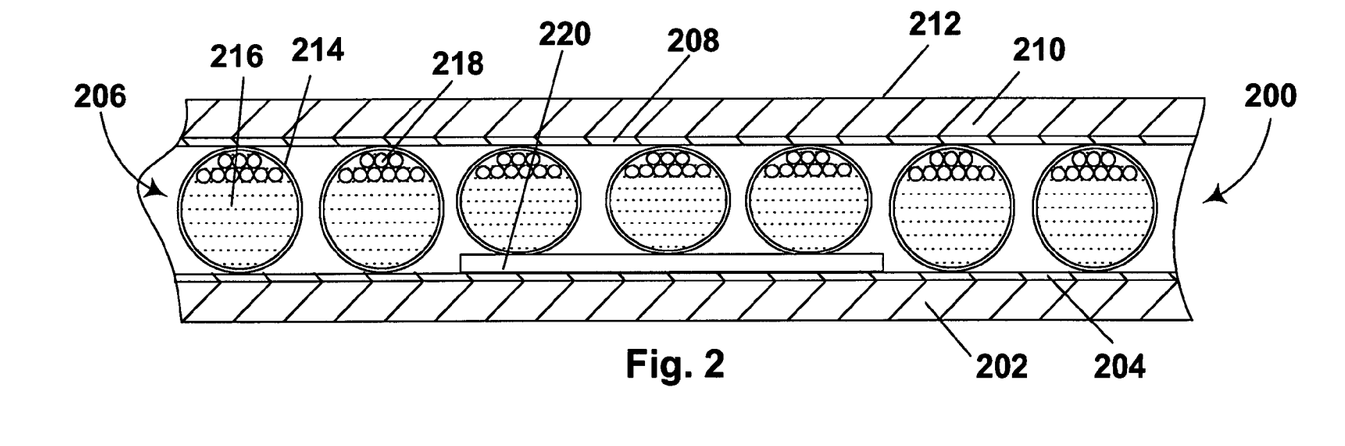
FIG. 2 is a schematic side elevation of an internal shim differential thickness display of the invention.

An internal shim differential thickness display (generally designated 200) of the present invention is shown in FIG. 2 of the accompanying drawings. The display 200 comprises a substrate 202 bearing a single continuous rear electrode 204; this electrode 204 may or may not be light-transmissive. The display 200 further comprises a layer of electrophoretic medium (generally designated 206), a single continuous light-transmissive front electrode 208 and a front substrate 210, which serves as a protective layer for the display 200, helping to prevent mechanical damage to the electrophoretic layer 206. The exposed surface 212 of the front substrate 210 serves as the viewing surface through which an observer views the display 200.

The electrophoretic layer 206 comprises a plurality of capsules, each of which comprises a capsule wall 214 within which is encapsulated a colored suspending fluid 216, which is typically dyed blue. However, unlike the electrophoretic layer 106 shown in FIGS. 1A and 1B, the capsules in FIG. 2 are of only a single type, containing negatively charged white titania particles 218.

The display 200 further comprises a shim 220 formed from a conductive material, for example aluminum, and in contact with the rear electrode 204. Thus, the electrophoretic layer 206 is thinner in the areas covered by the shim 220 than in the remaining areas of the display, and since the shim is formed from a conductive material, the electric field within the electrophoretic layer 206 will be greater in the areas covered by the shim 220 than in the remaining areas and the movement of the electrophoretic particles 218 and the change in optical state (brought about in the same manner as already discussed above with reference to FIGS. 1A and 1B) will also occur more quickly in the areas covered by the shim 220.

Figure 3:
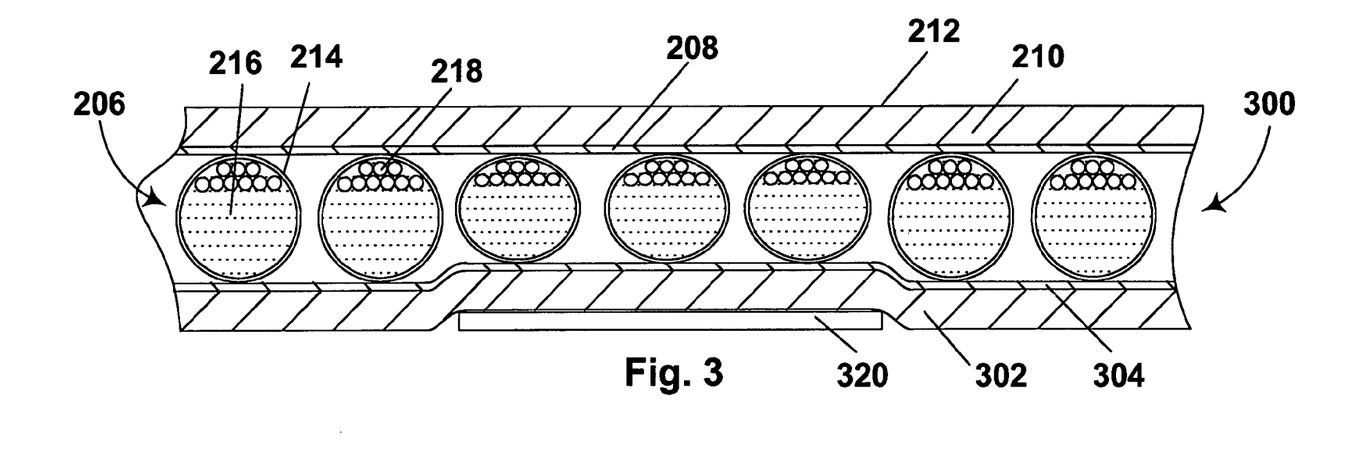
FIG. 3 is a schematic side elevation of an external shim differential thickness display of the invention.

FIG. 3 of the accompanying drawings is a schematic cross-section, generally similar to that of FIG. 2 through an external shim differential thickness display (generally designated 300) of the present invention. Most parts of the display 300 are essentially identical to the corresponding parts of the display 200 shown in FIG. 2 and are numbered accordingly. However, the internal shim 220 shown in FIG. 2 is replaced by an external shim 320, which is separated from the electrophoretic layer 206 by a rear electrode 304 and a substrate 302. As shown in FIG. 3, the presence of the external shim 320 causes distortion of the rear electrode 304 and the substrate 302, thereby producing a thin portion of the electrophoretic layer 206 having essentially the same dimensions as that of the external shim 320; FIG. 3 assumes, but does not illustrate, a rigid support contacting the lower surfaces (as illustrated in FIG. 3) of the shim 320 and substrate 302, so that these lower surfaces are held in the same plane. Accordingly, the external shim display 300 shown in FIG. 3 will operate in a manner exactly similar to the internal shim display 200 shown in FIG. 2. However, since the external shim 320 is not disposed between the electrodes 208 and 304 of the display 300, the electrical resistivity of the shim 320 is irrelevant, and if the deformation of substrate 302 and electrode 304 shown in FIG. 3 and caused by the presence of shim 320 are permanent, the shim 320 can be removed without affecting the functioning of the display.

Mixed Color Displays

As already mentioned, in its third main aspect, the present invention provides a mixed color display (the use of the "mixed color" for convenience does not of course preclude the possibility the optical characteristics of such a display may vary in some parameter other than color, for example reflectivity). In such a mixed color display, the electro-optic medium comprises a mixture of at least two types of electro-optic elements, each type having at least two different optical states. The various types of electro-optic elements have differing switching speeds, i.e., for any given electric field applied to the electro-optic medium, the various types of electro-optic elements will require differing periods to change optical states. The differing switching speeds of the various types of electro-optic elements increase the range of colors which can be displayed by any given pixel of the display (which must of course contain at least one, and preferably several, electro-optic elements of each type). Essentially, the differing switching speeds allow independent addressing of the differing types of electro-optic elements, even though those elements are present in a random mixture. Although in theory a mixed color display of the present invention can provide a full color display, in practice such a mixed color display will most commonly be used to provide a display capable of displaying a limited range of colors, but a range substantially larger than that afforded by a conventional electro-optic medium which exhibits only binary switching between two extreme optical states.

Any electro-optic medium in which the switching speed can be controlled and which permits more than one type of electro-optic element to exist in close proximity may be used in the mixed color displays of the present invention. Thus, for example, the electro-optic medium may be of the rotating bichromal member type, with the individual rotating bichromal members serving as electro-optic elements, or the electro-optic medium may be a microcavity particle-based electrophoretic medium, with multiple types of electrophoretic media segregated into separate microcavities. For convenience, this aspect of this invention will primarily be described below assuming that the electro-optic elements are individual capsules of an encapsulated electrophoretic medium, since the necessary changes needed to use other types of electro-optic medium will readily be apparent to those skilled in the technology of electro-optic displays.

To prepare a mixed color opposite charge dual particle encapsulated electrophoretic display, conveniently two batches of capsules are produced, each batch having a different pair of pigments that have both opposite charge and contrasting colors. One batch of capsules, intended to have a high switching speed and hereinafter called "Batch I" may be produced using a low viscosity solvent (e.g., heptane or Isopar E), a small capsule size (e.g., 30 to 40 μm), and/or be formulated in other ways so as to have a relatively fast switching time (typically, less than about 500 msec). The second batch ("Batch II") of capsules is formulated to have a switching time substantially greater than that of the first. Long switching times can be achieved by any of a number of techniques, including the use of higher viscosity solvents (e.g., Isopar V), larger capsules, or a variety of addenda that modify either the charging of the particles or the viscosity of the suspending fluid. The mixed color display is constructed using a mixture of capsules from the two batches. Assuming the switching times of the two sets of capsules are sufficiently different, the display can be driven with a short drive pulse so as to fully switch the Batch I capsules but have a very small effect on the Batch II capsules. A much longer drive pulse will switch both sets of capsules.

As already mentioned, in a conventional electro-optic display, each pixel has two extreme optical states. In contrast, in the mixed color displays of the present invention, each pixel may be regarded as having four extreme optical states. For ease of illustration, suppose that in the process described in the preceding paragraph, the Batch I capsules contain negative red-brown electrophoretic particles and positive green particles, while the Batch II capsules contain negative yellow particles and positive blue particles. Furthermore, assume a starting state for the display with both types of capsules having their negative pigments adjacent the front or viewing surface of the display. In this state, an observer viewing the viewing surface of the display will see a mixture of yellow capsules and red-brown capsules, so that (assuming, as is normally the case in practice, that the individual capsules are made sufficiently small that the observer cannot resolve them at a normal viewing distance), the observer will see a color intermediate yellow and red-brown, namely gold. If there is then applied to the display, a short "positive" driving pulse (i.e., a short pulse which moves positive particles towards the viewing surface) the positive green particles of the fast-switching Batch I capsules move to the viewing surface (and the negative red-brown particles away from the viewing surface) without much change in the more slowly switching Batch II capsules. The observer will then see a mixture of green capsules and yellow capsules, which will appear greenish-yellow. A substantially longer positive pulse will then subsequently switch the Batch II capsules, so that the observe will see a mixture of green capsules and blue capsules, which will appear blue-green.

At this point, both the positive particles lie adjacent the viewing surface. Reversing the driving voltage (i.e., applying negative pulses) generates a new set of colors. A short negative pulse switches the Batch I capsules to the red-brown state, while leaving the Batch II capsules blue, leading to a color intermediate red-brown and blue; the actual perceived color depends on the details of the pigments, their loading and their response in the device, and the ratio of the two kinds of capsules, but will be approximately neutral (gray) in hue. Finally, a longer negative pulse returns the display to its original state with yellow and red-brown capsules and an overall gold appearance.

Thus, this mixed color display may be regarded as having gold, yellow-green, blue-green, and gray extreme optical states. These four extreme optical states define a quadrilateral in the a*-b* plane of the conventional ICE color space. By appropriate choice of pulse sequences, any color within this quadrilateral can be achieved. In the specific medium described, the quadrilateral will be traversed in a counter-clockwise fashion, with the "horizontal" legs of the quadrilateral (corresponding to the rapidly switching Batch I capsules) being traversed more rapidly than the "vertical" legs. To achieve colors within the interior of the quadrilateral, it is first necessary to drive the medium to an intermediate position on one of the vertical legs and then move to the interior with a short pulse of appropriate polarity.

Those skilled in the art of color displays will appreciate from the foregoing description that the specific display described above does not allow control of luminosity independently of color, since the luminosity is controlled solely by the particles visible at the viewing surface at any given time. However, in the mixed color displays of the present invention, some degree of control of luminosity independently of color can be achieved by including in the electro-optic medium a plurality of third electro-optic elements (typically a third batch of capsules) intermixed with the first and second electro-optic elements, the third electro-optic elements being capable of being switched between dark and light optical states, with the switching time of the third electro-optic elements differing from those of both the first and second electro-optic elements. In practice, it will generally be convenient for the third electro-optic elements to have the fastest switching time of the three types of elements.

Obviously, the range of colors available in mixed color displays of the present invention are limited by the color ranges achievable by the constituent types of electro-optic elements. The colors at the corners of the quadrilateral in the a*-b* plane described above are intermediate in hue between the colors of the particles in the constituent capsules, so that generally very pure colors are difficult to obtain. However, the performance of the mixed color displays can be accurately predicted on the basis of the performance of displays constructed from the individual capsules (or other electro-optic elements) by a graphical procedure as illustrated in the Example below.

The following Example is now given, though by way of illustration only, to show a preferred mixed color display of the present invention and the electro-optic performance thereof.

EXAMPLE

The mixed color display described in this Example used two different types of opposite charge dual particle encapsulated electrophoretic media, with all four types of electrophoretic particles polymer-coated by the type of processes described in the aforementioned U.S. Pat. No. 6,822,782 (which require surface functionalization of the raw pigment surface before formation of the polymer). Accordingly, the procedures for functionalization and polymer formation will be described before the procedures for forming the capsules and the final display.

Surface Functionalization A: Positively Charged Pigments

A 1 L Erlenmeyer flask equipped for rapid magnetic stirring was charged with 600 mL of ethanol, 60 mL of deionized water, and 7.2 mL of ammonium hydroxide. 3-(N-styrylmethyl-2-aminoethylamino) propyltrimethoxysilane (53 mL of a 40% solution in methanol, UCT) was added to the resultant mixture and allowed to stir for five minutes. Raw pigment (60 g) was added to the mixture and allowed to react for 15 minutes. The resultant pigment slurry was discharged into two 750 mL plastic bottles and centrifuged at 3500 rpm for 10 minutes, using an Allegra 6 centrifuge, available from Beckman Coulter, Fullerton Calif. 92834. The supernatant liquor was discarded and approximately 500 g of ethanol was added to each centrifuge bottle, and the pigment was redispersed by shaking. The bottles were then centrifuged again (3500 rpm for 10 minutes), and the supernatant was again discarded. The pigment was allowed to air dry over night, and then further dried under vacuum at 65° C. for two hours. Finally, the pigment was hand ground with a mortar and pestle to a fine powder.

Surface Functionalization B: Negatively Charged Pigments

A 1 L Erlenmeyer flask equipped for rapid magnetic stirring was charged with 240 g of ethanol, 4 g of deionized water, and 60 g of pigment. Ten grams of Dow Corning Z-6030 (γ-methacryloxypropyltrimethoxysilane) was added to the mixture, which was allowed to stir for 15 minutes. The resultant pigment slurry was discharged into two 250 mL plastic bottles and centrifuged at 3500 rpm for 10 minutes. The supernatant liquor was discarded, and approximately 200 g of ethanol was added to each centrifuge bottle, and the pigment was redispersed by shaking. The bottles were then centrifuged again (3500 rpm for 10 minutes), and the supernatant again discarded. The pigment was allowed to air dry over night, and then further dried under vacuum at 65° C. for two hours. Finally, the pigment was hand ground with a mortar and pestle to a fine powder.

Formation of Polymer Coating

A 250 mL round bottomed flask was charged with 60 mL of toluene, 60 g of pigment (surfaced functionalized by one of the methods described above), 49.9 g of lauryl methacrylate, and an variable amount of a comonomer as specified in the Table below (an additional amount of lauryl methacrylate is substituted if no comonomer is used). The flask was set to rapid stirring in a 65° C. oil bath and purged with nitrogen. Meanwhile, 0.6 g of AIBN (2,2'-azobisisobutyronitrile) initiator was dissolved in 12 mL of toluene, and added to the flask by pipette. The resultant mixture was allowed to react overnight, under nitrogen and at 65° C. The nitrogen feed was then removed, and approximately 100 mL of ethyl acetate was added to the flask. The resultant mixture was then split between two 250 mL plastic bottles, and approximately 100 mL of additional ethyl acetate was added to each bottle. The bottles were shaken vigorously and the polymer-coated pigment was isolated by centrifugation at 3500 rpm for 15 minutes. An aliquot of the supernatant was removed for free polymer testing, and the remainder was discarded. The pigment was washed twice by adding approximately 200 mL of ethyl acetate to each bottle, shaking vigorously to disperse the pigment, and centrifuging at 3500 rpm for 15 minutes. The pigment was air dried overnight, then dried under vacuum at 65° C. overnight.

The specific pigments and monomers thus functionalized and polymer-coated are listed in the Table below.

TABLE

| Run | Pigment | Functionalization Method | Comonomer | Amount g |
|---|---|---|---|---|
| I-1 | DuPont R-794 (White) | B | 2,2,2-trifluoroethyl methacrylate | 1.73 |
| I-2 | Shepherd Brown 12 | B | 2,2,3,4,4,4-hexafluorobutyl acrylate | 2.44 |
| I-3 | Shepherd Green 223 | A | 2,2,2-trifluoroethyl methacrylate | 1.73 |
| II-1 | Shepherd Yellow 253 | B | 2,2,3,4,4,4-hexafluorobutyl acrylate | 2.44 |
| II-2 | Shepherd Blue 212 | A | Lauryl Methacrylate | 2.62 |

The polymer-coated pigment particles thus produced were incorporated into electrophoretic internal phases (i.e., mixtures of pigment particles dispersed in a suspending fluid) and these internal phases encapsulated and the resultant capsules formed into displays as described below.

Preparation of Batch I Internal Phase

A 60% by weight dispersion of each polymer-coated pigment used (Pigments I-1, I-2, and I-3 in the Table above) in Isopar E was prepared, sonicated for one hour, and mixed on a roll mill overnight. 180 Grams (ca. 150 mL) of internal phase was produced by combining 11.25 g of pigment I-1 dispersion, 33.75 g of pigment I-2 dispersion, 90.00 g of pigment I-3 dispersion, 8.10 g of charging agent (Solsperse 17000, 10% by weight in Isopar E), 0.41 g of surfactant (Span85), 29.70 g of Kraton G-1702 (3% by weight in Isopar E), and 6.80 g of Isopar E solvent. This dispersion was mixed on a roll mill overnight.

Preparation of Batch II Internal Phase

A 60% by weight dispersion of each polymer-coated pigment used (Pigments II-1 and II-2 in the Table above) in Isopar V was prepared, sonicated for one hour, and mixed on a roll mill overnight. 200 Grams (ca. 150 mL) of internal phase was produced by combining 100.00 g of pigment II-1 dispersion, 50.00 g of pigment II-2 dispersion, 9.00 g of charging agent (Solsperse 17000, 10% by weight in Isopar E), 0.45 g of surfactant (Span85), and 40.55 g of Isopar V solvent. This dispersion was mixed on a roll mill overnight.

Encapsulation and Preparation of Displays

Internal Phase Batches I and II were encapsulated separately by the same procedure. A 500 mL jacketed reactor was heated to 40° C. and charged with 240 g of deionized water; 10 g of dry gelatin was then added and allowed to swell. After one hour of swelling, the gelatin solution was slow-stirred (100 rpm) with an overhead stirrer for thirty minutes. Separately, 10 g of acacia was dissolved in 98.3 g of deionized water and the resultant solution heated to 40° C. Also separately, each of the internal phase batches described above (ca. 150 mL each) were heated to 40° C. and then added, over a period of approximately 2 minutes, to the gelatin solution. Each gelatin solution was stirred (350 rpm) during the addition, which was conducted by introducing the internal phase through a dropping funnel, the outlet of which was placed below the surface of the gelatin solution. After the addition of the internal phase had been completed, the rate of stirring was increased (to ca. 750 rpm) and the stirring continued for one hour at 40° C. in order to emulsify the internal phase into droplets having an average diameter of about 40 μm.

The emulsions produced were diluted with 153.3 g of deionized water warmed to 40° C., and the acacia solution was added. The pH of the mixture was lowered to 4.80 using 10% aqueous acetic acid, and the stirring was continued for a further 40 minutes. The temperature of the mixture was lowered to 10° C. over the course of two hours, and 10 g of 50% glutaraldehyde was added. After this addition, the mixture was gradually warmed to 25° C. and stirred vigorously for a further 12 hours. Finally, stirring was discontinued, and the mixture was discharged into a 750 mL plastic bottle.

The capsules were separated by size to yield a distribution between 30 and 50 μm diameter, with a mean diameter of about 40 μm. Such a distribution can be effected by sieving the capsules for 120 seconds on a 38 μm sieve and then for 120 seconds on a 25 μm sieve to produce the final capsule slurry.

The resulting capsule slurries were centrifuged, and the pH was raised above 8.0 by the addition of 1% ammonium hydroxide solution. The slurries were then mixed with a polyurethane binder at a ratio of 1 part by weight binder to 8 parts by weight of capsules; a 1% aqueous solution of hydroxypropylmethylcellulose (HPMC) was added as a thickener, in an amount sufficient to provide a desired weight fraction of 0.002 HPMC in the slurry, and pure Triton X-100 was added as a surfactant, with a desired weight fraction of 0.001. The resultant mixtures were stirred for one hour. In a separate bottle, the two slurries (Batches I and II) were mixed on an equal-mass basis.

The three slurries produced (containing capsules of Batches I and II, and a mixture of the two) were separately bar coated on to 5 mil (127 mm) thick indium tin oxide (ITO) coated polyester film, the capsules being coated on to the ITO-coated surface of the film. The coated films were allowed to oven dry at 60° C. for 15 minutes to produce an electrophoretic medium approximately 30 μm thick containing essentially a single layer of capsules (see the aforementioned 2003/0137717). A custom polyurethane lamination adhesive doped with 1000 ppm of tetrabutylammonium hexafluorophosphate (an additive which serves to adjust the electrical conductivity of the lamination adhesive —see copending application Ser. No. 10/898,027, filed Jul. 23, 2004 (Publication No. 2005/0122563, was then laminated over the capsules, and the resultant sub-assembly was laminated a second time, via the lamination adhesive, to a segmented graphite backplane to produce experimental single pixel displays suitable for measuring the electro-optic properties of the display.

Electro-Optic Properties of Displays

The electro-optical (EO) response of the displays thus produced were measured in both directions over a range of applied voltages and pulse lengths. The color of the light reflected by the display was recorded as a function of time during the pulse using a rapid-scan fiber-optic spectrophotometer system (B+W TEK BTC 112E Thermoelectrically-cooled CCD Array Spectrophotometer). The spectral intensity information was transformed to a visual (L*a*b*) color space using well-known transformations, together with calibration information derived from the reflectivity of a known white standard.

Figure 4A:
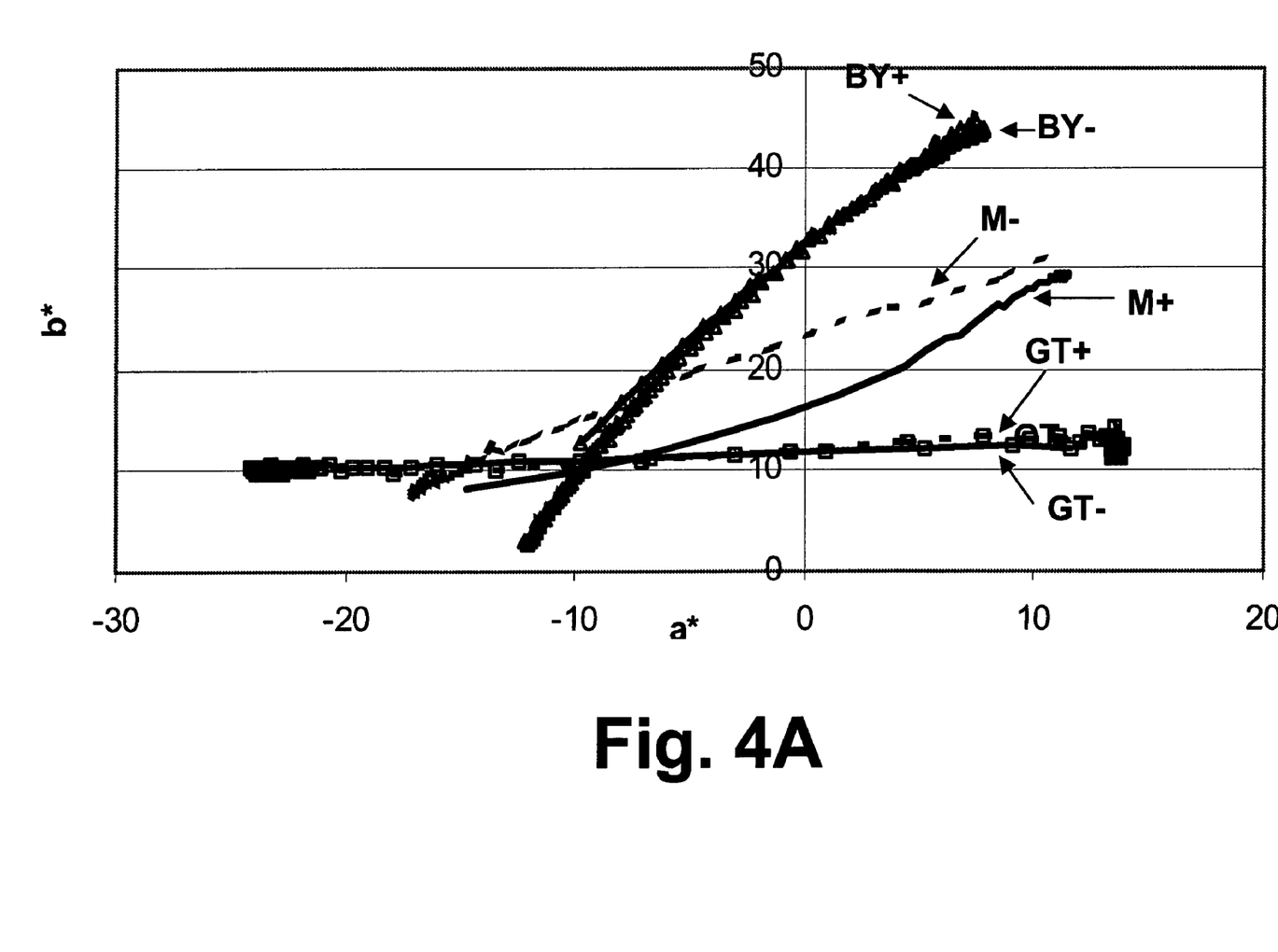
FIGS. 4A and 4B are graphs showing the colors capable of being displayed by a mixed color display of the invention, and the colors displayed by the two types of electrophoretic capsules used to form this mixed color display, FIG. 4A showing the color response in the a*-b* plane and FIG. 4B showing the response in the a*-L* plane of the conventional ICE color space.
Figure 4B:
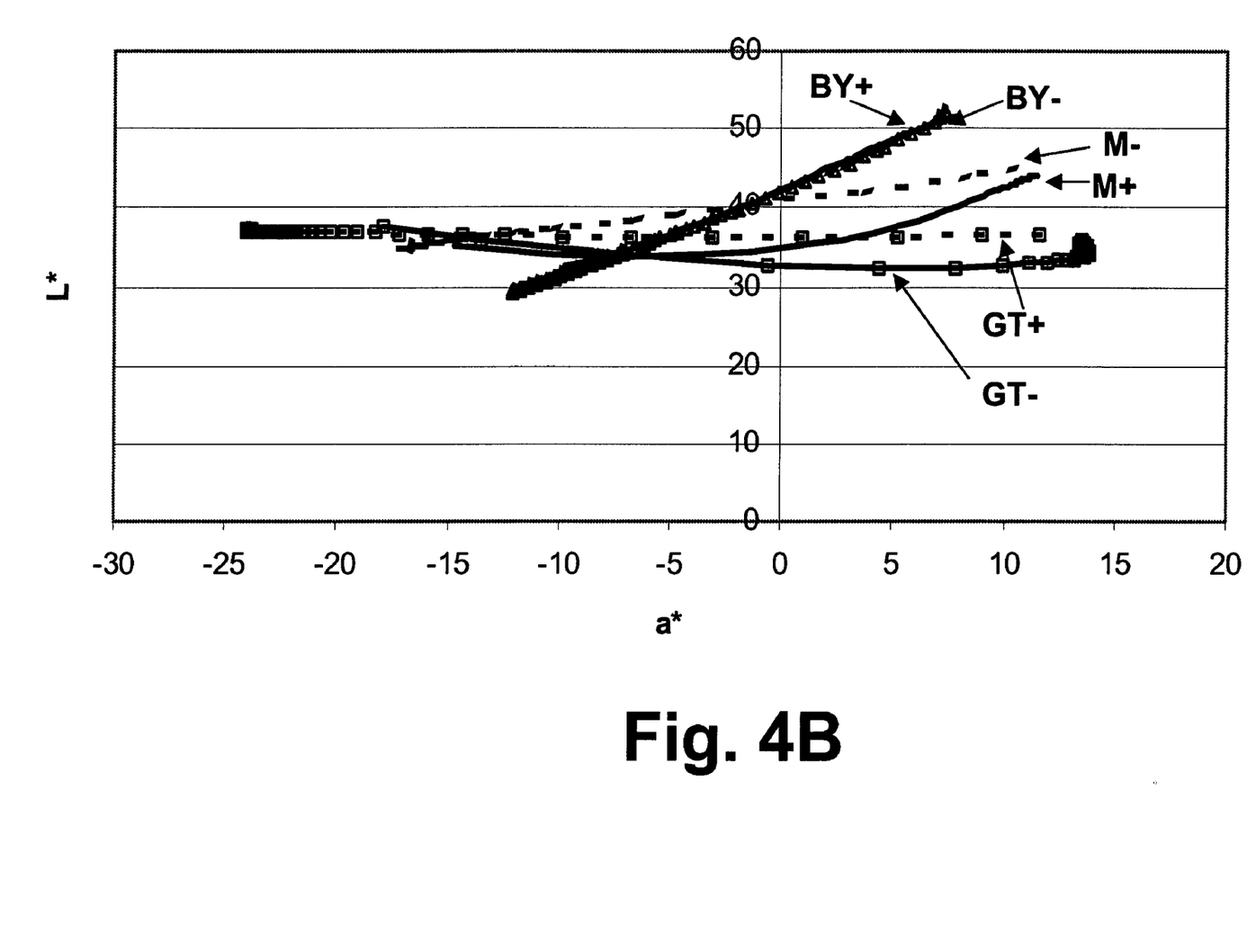

FIGS. 4A and 4B show the results obtained from displays comprising the mixed color display of the invention containing both types of capsules (blue/yellow and tan/green), together with two control displays each containing only one type of capsule, FIG. 4A being a projection of the relevant curves on to the a*b* plane and FIG. 4B a projection on to the a*L* plane, and using ±15 V drive pulses. In FIGS. 4A and 4B (and also in FIG. 5 discussed below), "BW+" denotes the curve obtained from a display containing only the blue/yellow capsules when a positive voltage is applied, and "BW−" the curve obtained from the same display when a negative voltage is applied. The corresponding curves from the tan/green capsule display are denoted "GT+" and "GT−", while those from mixed color display of the invention containing both types of capsules are denoted "M+" and "M−". The tan/green capsules had a switching speed substantially greater than that of the blue/yellow capsules. It will be seen from FIGS. 4A and 4B that the curves for the displays containing only one type of capsules are almost linear, and thus that these displays are only capable of producing a very narrow range of colors lying on the curve between the colors of the two particles used in the display. (It was also found that, in the specific system tested, the addition to a display comprising only a single type of capsules containing a third type of electrophoretic particle having a charge of the same polarity as one of the other two types of particles did not lead to an appreciable increase in the range of colors available.) In contrast, the mixed color display containing both types of capsules displayed substantial hysteresis in its color response, and this hysteresis allowed access to a substantial area in the a*b* color plane, intermediate the locations of the displays using the two types of capsules separately but covering a much larger range of perceived colors that were available using either type of capsule alone.

Figure 5:
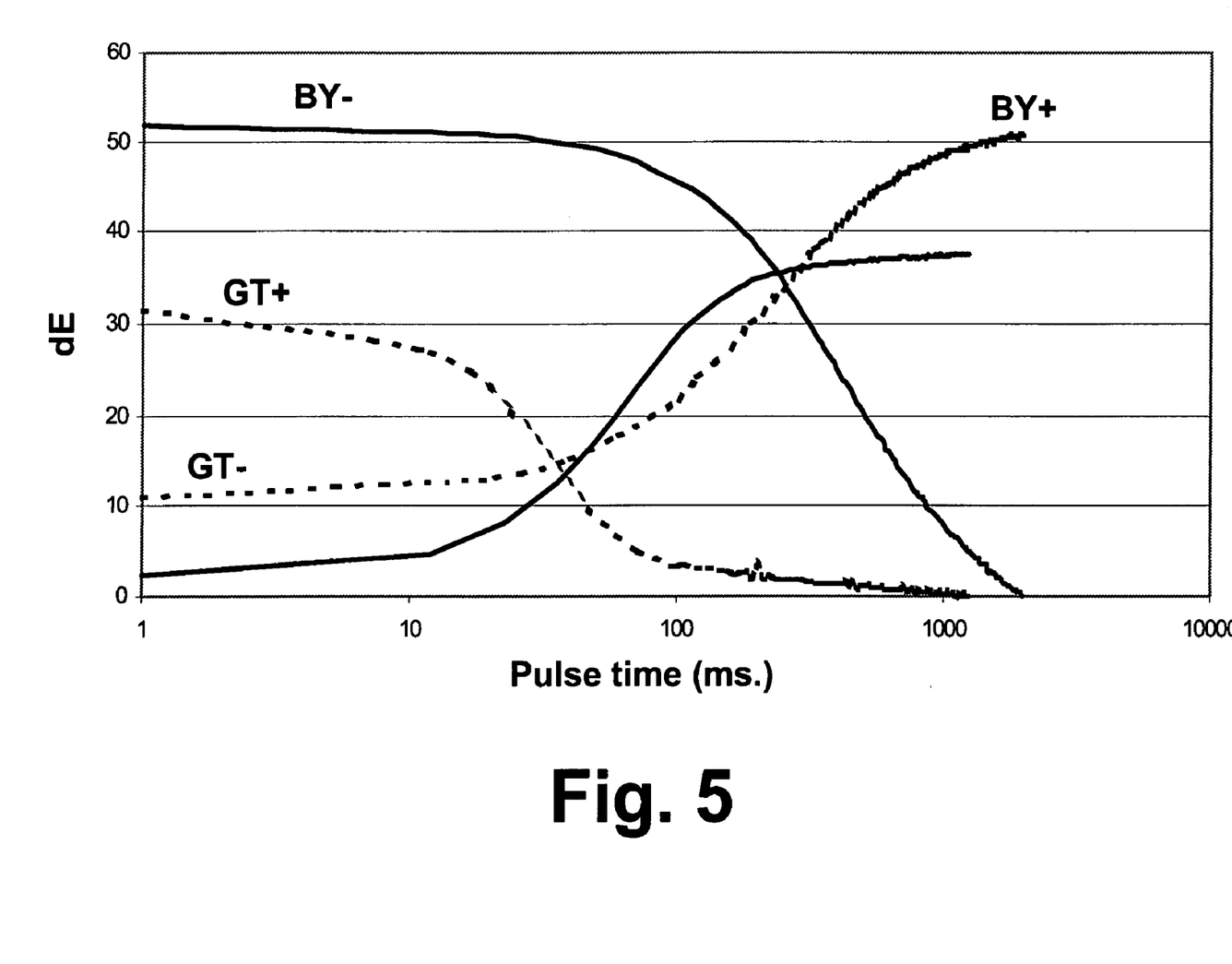
FIG. 5 is a graph showing the electro-optic response of the two types of capsules used in FIGS. 4A and 4B as a function of time for which an electric field is applied.

FIG. 5 shows that the two constituent capsules used in these displays have substantially different response times. (The units of the abscissa in FIG. 5 are units of the color difference ΔE* between the L*a*b* coordinates at the relevant time and the similar value after a long +15 V drive pulse, chosen as a matter of convenience to provide monotonic changes in ΔE*.) When a +15 V pulse is applied, the fast (green-tan) capsule takes approximately 36 msec to change half-way from the tan state to the green state; the reverse transition requires approximately 60 msec. The slow blue-yellow capsules are several times slower, requiring 410 ms and 260 ms for the +15 V and −15 V transitions respectively. The relative response times for the two types of capsules are one determinant (along with the colors of the constituent pigments) for the width of the hysteresis curves in FIGS. 4A and 4B. The larger the difference in response between the two capsules, the larger the area of hysteresis.

The relative response times of differing capsules can be controlled by several factors, including the charge (zeta potential) and size of the electrophoretic particles, and especially the viscosity of the suspending fluid and the size of the capsules, with higher viscosity and larger capsules yielding slower response times. The viscosity of the medium can be controlled either by solvent choice (e.g., Isopar E vs. Isopar G) or by polymeric viscosifiers (e.g., poly(isobutylene) or Kraton (styrene-butadiene block copolymers, also used as image stability addenda in electrophoretic media). Obviously, the methods used to control the switching speeds of other types of electro-optic elements will vary with the types of elements used. For example, the switching speeds of microcell media can be varied in ways directly analogous to those used for encapsulated electrophoretic media, while in the case of the rotating bichromal member media, switching speed can be varied by controlling the magnitude of the dipole in the rotating bichromal members.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense. For example, the displays etc. of the present invention may be used with any of the aforementioned types of electro-optic media. Electrophoretic media, especially encapsulated electrophoretic media, tend to be the preferred media, but numerous other types of imaging media may be used. When electrophoretic are used, they may contain any known components, for example as described in the aforementioned E Ink and MIT patents and applications.

What is claimed is:

1. An electro-optic display comprising a layer of electro-optic medium having first and second optical states differing in at least one optical characteristic, the medium being capable of being changed from its first optical state to its second optical state by application of an electric field thereto, and at least one electrode disposed adjacent the layer of electro-optic medium and arranged to apply an electric field thereto, the layer of electro-optic medium having at least one first area having a first thickness and at least one second area having a second thickness less than the first thickness, such that, upon application of an electric field to the electro-optic medium by the electrode, the at least one second area will change from its first to its second optical state at a rate different from the at least one first area.

2. An electro-optic display according to claim 1 wherein the electro-optic medium is a particle-based electrophoretic medium.

3. An electro-optic display according to claim 2 wherein the electro-optic medium is a microcavity particle-based electrophoretic medium.

4. An electro-optic display according to claim 1 further comprising a shim material having a conductivity differing from that of the electro-optic medium is disposed between at least one of the first and second areas of the electro-optic medium and the electrode.

5. An electro-optic display according to claim 4 wherein the shim material comprises an insulating material printed on the electrode.

6. An electro-optic display according to claim 1 further comprising a shim material disposed on the opposed side of the electrode from at least one of the first and second areas of the electro-optic medium, the shim material distorting the electrode so that the thickness of the electro-optic medium adjacent the shim material differs from that of the electro-optic medium in areas not adjacent the shim material.

* * * * *